United States Patent
Lee et al.

(10) Patent No.: US 12,394,869 B2
(45) Date of Patent: Aug. 19, 2025

(54) BATTERY MODULE, BATTERY PACK COMPRISING THE SAME, AND VEHICLE

(71) Applicant: LG ENERGY SOLUTION, LTD., Seoul (KR)

(72) Inventors: Bum-Jick Lee, Daejeon (KR); Young-Su Son, Daejeon (KR); Seok-Won Jeung, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 504 days.

(21) Appl. No.: 17/909,134

(22) PCT Filed: Jun. 3, 2021

(86) PCT No.: PCT/KR2021/006947
§ 371 (c)(1),
(2) Date: Sep. 2, 2022

(87) PCT Pub. No.: WO2022/005032
PCT Pub. Date: Jan. 6, 2022

(65) Prior Publication Data
US 2023/0095885 A1    Mar. 30, 2023

(30) Foreign Application Priority Data
Jun. 30, 2020   (KR) ................ 10-2020-0080587

(51) Int. Cl.
*H01M 50/503* (2021.01)
*H01M 50/213* (2021.01)
*H01M 50/559* (2021.01)

(52) U.S. Cl.
CPC ....... *H01M 50/503* (2021.01); *H01M 50/213* (2021.01); *H01M 50/559* (2021.01); *H01M 2220/20* (2013.01)

(58) Field of Classification Search
CPC .................................................. H01M 50/503
See application file for complete search history.

(56) References Cited

U.S. PATENT DOCUMENTS

| 9,219,262 B2 | 12/2015 | Kimura et al. |
| 10,720,616 B2 | 7/2020 | Seol et al. |

(Continued)

FOREIGN PATENT DOCUMENTS

| CN | 107732607 A | 2/2018 |
| CN | 109546024 A | 3/2019 |

(Continued)

OTHER PUBLICATIONS

International Search Report (with partial translation) and Written Opinion dated Sep. 29, 2021, for corresponding International Patent Application No. PCT/KR2021/006947.

(Continued)

*Primary Examiner* — Brian R Ohara
(74) *Attorney, Agent, or Firm* — Morgan, Lewis & Bockius LLP

(57) ABSTRACT

A battery module includes a plurality of cylindrical battery cells each having a positive electrode terminal and a negative electrode terminal on one side of each respective battery cell; a busbar including an electrically conductive material and having a plate shape; and at least two types of connecting members each including an electrically conductive material, and having an elongated body, wherein one end in a direction in which the body extends is joined to the busbar, and the other end is joined to any one of the positive electrode terminal and the negative electrode terminal, the at least two types of connecting members having different joined areas depending on a joined terminal among the positive electrode terminal and the negative electrode terminal.

12 Claims, 7 Drawing Sheets

(56) References Cited

U.S. PATENT DOCUMENTS

| | | | |
|---|---|---|---|
| 10,720,626 | B2 | 7/2020 | Harris et al. |
| 11,217,862 | B2 | 1/2022 | Barton et al. |
| 11,824,226 | B2 | 11/2023 | Muratsu et al. |
| 2002/0022178 | A1 | 2/2002 | Asaka et al. |
| 2018/0183020 | A1 | 6/2018 | Ju et al. |
| 2018/0212222 | A1 | 7/2018 | Barton et al. |
| 2019/0097190 | A1* | 3/2019 | Seol ............... H01M 50/503 |
| 2019/0259986 | A1* | 8/2019 | Harris, III ........ H01M 50/213 |
| 2019/0280267 | A1 | 9/2019 | Bae et al. |
| 2019/0348661 | A1 | 11/2019 | Bae |
| 2020/0127249 | A1 | 4/2020 | Yoon et al. |
| 2020/0212404 | A1 | 7/2020 | Omura et al. |

FOREIGN PATENT DOCUMENTS

| | | |
|---|---|---|
| CN | 209401797 U | 9/2019 |
| CN | 111033808 A | 4/2020 |
| EP | 3 460 878 A1 | 3/2019 |
| JP | H6-038118 U | 5/1994 |
| JP | 4660328 B2 | 3/2011 |
| JP | 4733248 B2 | 7/2011 |
| JP | 2018-077933 A | 5/2018 |
| JP | 2020-503652 A | 1/2020 |
| JP | 2020-061243 A | 4/2020 |
| JP | 2020-514991 A | 5/2020 |
| KR | 10-2018-0080541 A | 7/2018 |
| KR | 10-2018-0129115 A | 12/2018 |
| KR | 10-2019-0034020 A | 4/2019 |
| KR | 10-2019-0097231 A | 8/2019 |
| WO | 2014/155412 A1 | 10/2014 |
| WO | 2019/124107 A1 | 6/2019 |
| WO | 2020/066055 A1 | 4/2020 |

OTHER PUBLICATIONS

Office Action issued in corresponding Chinese Patent Application No. 202180023866.2 dated Sep. 23, 2023. Note: KR 20180129115A cited therein is already of record.

Office Action issued in corresponding Japanese Patent Application No. 2022-552473 dated Sep. 25, 2023.

Office Action dated Jun. 26, 2024 issued in corresponding Chinese Patent Application No. 202180023866.2. (Note: CN 209401797 U was previously cited).

The extended European Search Report, dated Feb. 5, 2024, issued in corresponding EP Patent Application No. 21832306.1. (Note: KR 10-2018-0129115 A and US 2019/0348661 A1 were previously cited).

Office Action dated Jan. 21, 2024 issued in corresponding Korean Patent Application No. 10-2020-0080587. (Note: KR 10-2018-0129115 A and KR 10-2019-0097231 were previously cited.).

\* cited by examiner

BATTERY MODULE, BATTERY PACK COMPRISING THE SAME, AND VEHICLE

TECHNICAL FIELD

The present disclosure relates to a battery module, a battery pack comprising the same and a vehicle, and more particularly, to a battery module with reliability of electrical connection between internal components and improved durability of a product, a battery pack comprising the same and a vehicle.

The present application claims the benefit of Korean Patent Application No. 10-2020-0080587 filed on Jun. 30, 2020 with the Korean Intellectual Property Office, the disclosure of which is incorporated herein by reference in its entirety.

BACKGROUND ART

Recently, with the rapid increase in demand for portable electronic products such as laptop computers, video cameras and mobile phones and the extensive development of electric vehicles, accumulators for energy storage, robots and satellites, many studies are being made on high performance secondary batteries that can be repeatedly recharged.

Currently, commercially available secondary batteries include nickel-cadmium batteries, nickel-hydrogen batteries, nickel-zinc batteries, lithium secondary batteries and the like, and among them, lithium secondary batteries have hale or no memory effect, and thus they are gaining more attention than nickel-based secondary batteries for their advantages that recharging can be done whenever it is convenient, the self-discharge rate is very low and the energy density is high.

Additionally, a battery module including a plurality of secondary batteries or battery cells has a serious problem with stability and operating efficiency when overvoltage, overcurrent or overheat occurs in the battery cells, so a means for detection and control is necessary. This configuration may be, for example, a Battery Management System (BMS) equipped with various types of devices.

In this instance, to detect the current of the plurality of battery cells of the battery module, electrical connection is established between the plurality of battery cells using a busbar.

However, the battery module applied in an environment in which strong impacts or vibration are applied such as a vehicle needs to maintain stable electrical connection between the plurality of battery cells. That is, when deformation or damage occurs in the internal components of the busbar during or after fabrication of the battery module or while the battery module is in use, the stable electrical connection between the plurality of battery cells is not maintained, causing a detection failure of the amount of current of the BMS, a calculation failure of the battery electricity capacity, or an output reduction of the battery module.

Moreover, when a part of the busbar is broken by external impacts, some pieces may cause a short circuit between the plurality of battery cells.

DISCLOSURE

Technical Problem

The present disclosure is designed to solve the above-described problem, and therefore the present disclosure is directed to providing a battery module with reliability of electrical connection between internal components and improved durability of a product, a battery pack comprising the same and a vehicle.

These and other objects and advantages of the present disclosure may be understood by the following description, and will be apparent from the embodiments of the present disclosure. In addition, it will be readily appreciated that the objects and advantages of the present disclosure may be realized by means and combinations thereof.

Technical Solution

To achieve the above-described object, a battery module according to the present disclosure includes a plurality of cylindrical battery cells having a positive electrode terminal and a negative electrode terminal on one side, a busbar including an electrically conductive material and having a plate shape, and at least two types of connecting members including an electrically conductive material, and having an elongated body, wherein one end in a direction in which the body extends is joined to the busbar, and the other end is joined to any one of the positive electrode terminal and the negative electrode terminal, the at least two types of connecting members having different joined areas depending on a joined terminal among the positive electrode terminal and the negative electrode terminal.

Additionally, the positive electrode terminal may have a larger exposed outer surface area than the negative electrode terminal, the at least two types of connecting members may include a first connecting member connected to the negative electrode terminal and a second connecting member connected to the positive electrode terminal, and the joined area between the second connecting member and the positive electrode terminal may be larger than the joined area between the first connecting member and the negative electrode terminal.

Furthermore, the connecting member may include a first connecting member having a wire shape extending in a lengthwise direction, and a second connecting member having a strap shape extending in the lengthwise direction.

Moreover, the battery module may further include a module case having an internal space in which the plurality of cylindrical battery cells is received, wherein the busbar is mounted on an outer side of the module case, the module case having a first exposure hole through which at least part of the negative electrode terminal is exposed to outside and a second exposure hole through which at least part of the positive electrode terminal is exposed.

Additionally, the module case may include a protrusion which protrude from an edge of the first exposure hole or the second exposure hole toward the connecting member, and an insertion groove provided at a part of the protrusion, into which a part of the connecting member is inserted.

Moreover, the busbar may include an extended portion disposed on one side of the plurality of cylindrical battery cells and extending along a direction in which the plurality of cylindrical battery cells is arranged, and a connection portion which protrudes from the extended portion toward the positive electrode terminal or the negative electrode terminal and is configured to be joined to a part of the connecting member.

Furthermore, the plurality of cylindrical battery cells may be arranged in a plurality of rows and a plurality of columns, and the busbar may extend in zigzag along the direction of the plurality of cylindrical battery cells is arranged.

Moreover, the busbar may include a fixed protrusion which protrudes from a part of the connection portion.

In addition, to achieve the above-described object, a battery pack of the present disclosure includes at least one battery module.

Further, to achieve the above-described object, a vehicle of the present disclosure includes at least one battery module.

Advantageous Effects

According to an aspect of the present disclosure, the present disclosure includes the busbar and the at least two types of connecting members having different joined areas depending on the joined terminal among the positive electrode terminal and the negative electrode terminal, thereby optimizing the joined area of the connecting member according to the outer area of the positive electrode terminal or the negative electrode terminal.

That is, as opposed to connecting the busbar to the positive electrode terminal or the negative electrode terminal using the existing single connecting member, the present disclosure may differently set the joined area according to the type of the terminal to which the at least two types of connecting members are joined. That is, for example, when the area of the positive electrode terminal is larger than that of the negative electrode terminal, the present disclosure may increase the joined area by applying different types of connecting members. Accordingly, the present disclosure may effectively reduce the separation of the joined part between the connecting member and the positive electrode terminal or the negative electrode terminal. Ultimately, it is possible to effectively improve the durability of the battery module even in case that the battery module is mounted in a vehicle that is exposed to an environment in which frequent vibrations and impacts occur.

Additionally, according to an aspect of the present disclosure, the present disclosure includes the extended portion and the connection portion in the busbar, thereby minimizing the extended length of the connecting member. That is, the extended portion and the connection portion are configured such that a part of the busbar is adjacent to the positive electrode terminal or the negative electrode terminal, thereby minimizing the extended length of the connecting member configured to connect the connection portion to the positive electrode terminal or the negative electrode terminal. Accordingly, the present disclosure may effectively reduce the increased material cost and increased short circuit risk caused by collision with external materials with the increasing length of the connecting member.

BRIEF DESCRIPTION OF THE DRAWINGS

The accompanying drawings illustrate the preferred embodiments of the present disclosure, and together with the following detailed description, serve to provide a further understanding of the technical aspect of the present disclosure. However, the present disclosure should not be construed as being limited to the drawings.

DETAILED DESCRIPTION

Figure 1:
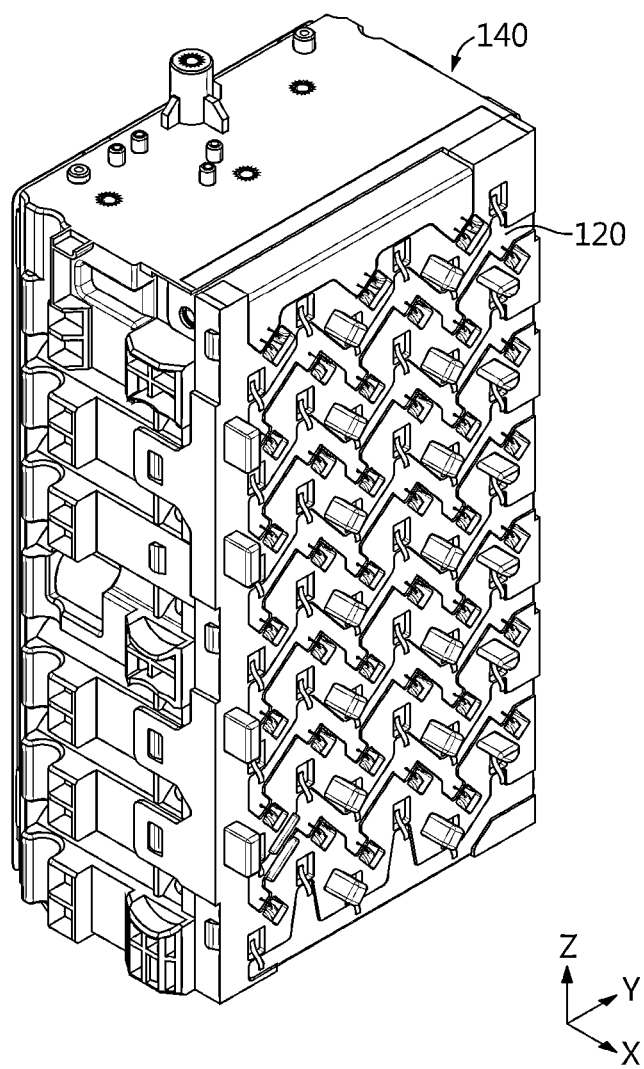
FIG. 1 is a schematic perspective view of a battery module according to an embodiment of the present disclosure.

Hereinafter, the preferred embodiments of the present disclosure will be described in detail with reference to the accompanying drawings. Prior to the description, it should be understood that the terms or words used in the specification and the appended claims should not be construed as being limited to general and dictionary meanings, but rather interpreted based on the meanings and concepts corresponding to the technical aspects of the present disclosure on the basis of the principle that the inventor is allowed to define the terms appropriately for the best explanation.

Therefore, the embodiments described herein and the elements shown in the drawings are just a most preferred embodiment of the present disclosure, but not intended to fully describe the technical aspects of the present disclosure, so it should be understood that a variety of other equivalents and modifications could have been made thereto at the time that the application was filed.

Figure 2:
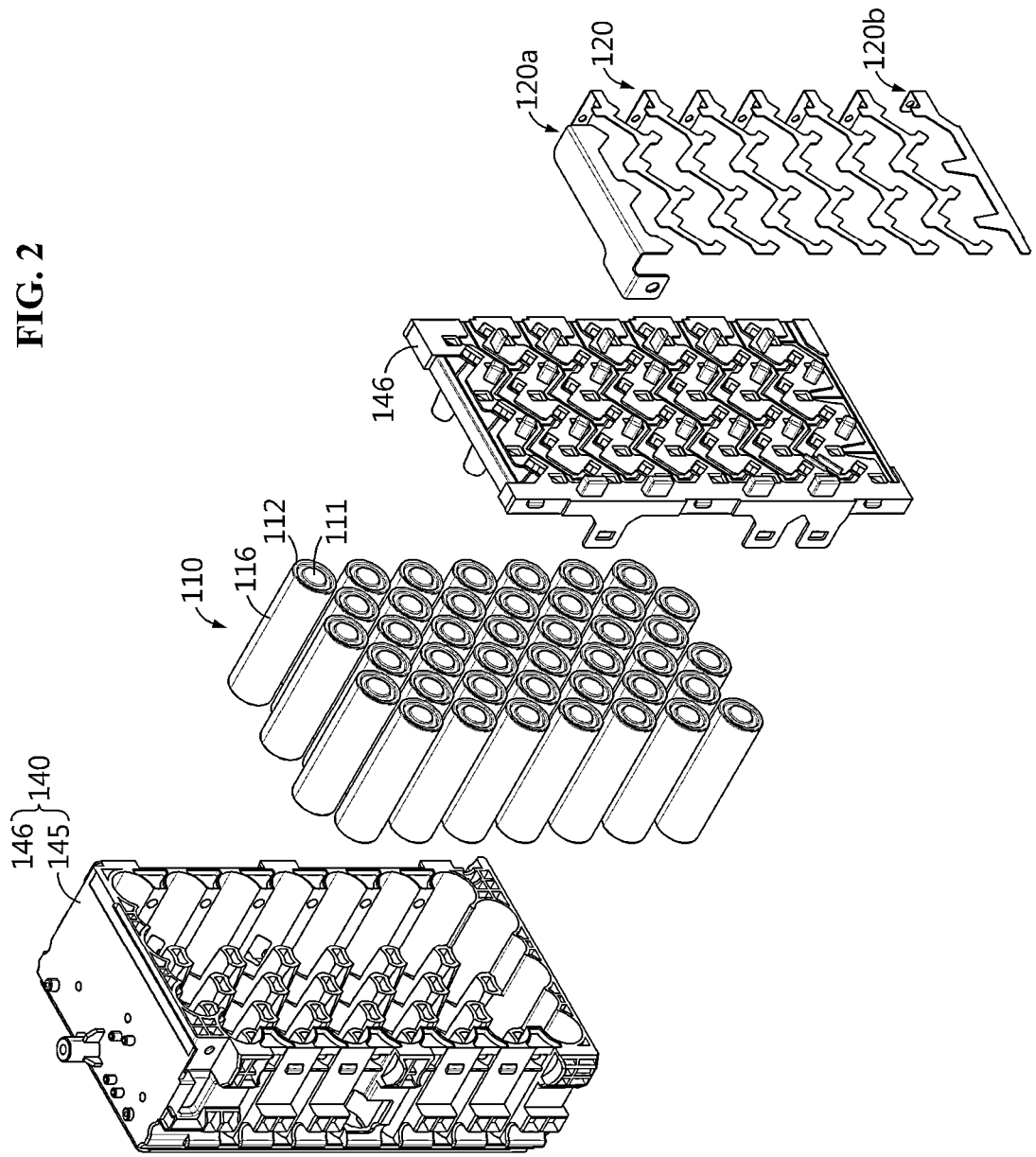
FIG. 2 is a schematic partial exploded perspective view of a battery module according to an embodiment of the present disclosure.

FIG. 1 is a schematic perspective view of a battery module according to an embodiment of the present disclosure. FIG. 2 is a schematic partial exploded perspective view of the battery module according to an embodiment of the present disclosure. Additionally, FIG. 3 is a schematic right side view of the battery module according to an embodiment of the present disclosure.

Figure 3:
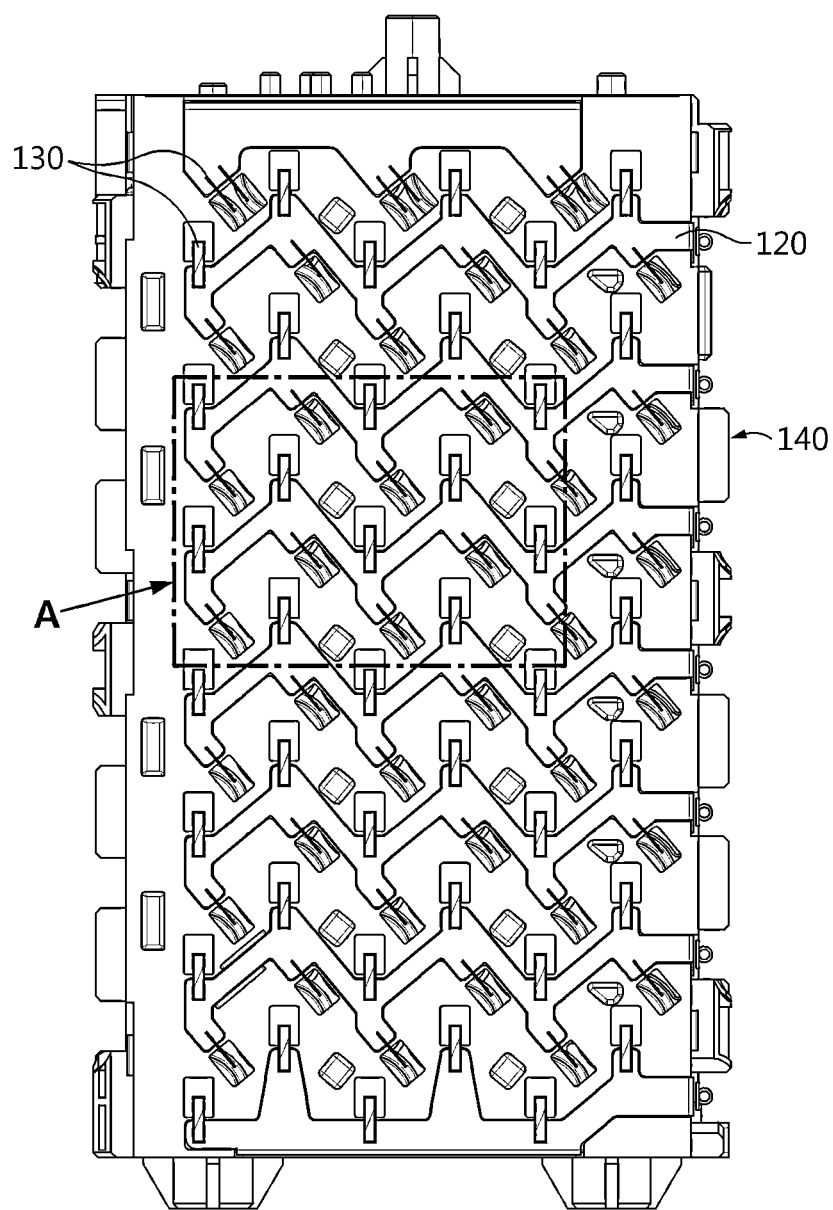
FIG. 3 is a schematic right side view of a battery module according to an embodiment of the present disclosure.

Referring to FIGS. 1 to 3, the battery module 100 according to an embodiment of the present disclosure includes a plurality of cylindrical battery cells 110, a busbar 120 and at least two types of connecting members 130.

Specifically, as shown in FIG. 2, each of the plurality of cylindrical battery cells 110 may include a battery can 116, and a positive electrode terminal 111 and a negative electrode terminal 112 on one side (the right side in the positive X direction) of the body of the battery can 116. The positive electrode terminal 111 may have a disc-shaped outer surface that is exposed to the outside. The negative electrode terminal 112 may be an edge portion disposed around the positive electrode terminal 111. The positive electrode terminal 111 and the negative electrode terminal 112 may be spaced a predetermined distance apart from each other. The positive electrode terminal 111 and the negative electrode terminal 112 may be electrically isolated from each other. Additionally, the positive electrode terminal 111 of the cylindrical battery cell 110 may have the exposed outer surface area that is larger than the negative electrode terminal 112.

Additionally, the cylindrical battery cell 110 may include an electrode assembly (not shown) that is electrically connected to each of the positive electrode terminal 111 and the negative electrode terminal 112 and is received in the battery can 116. The configuration of the cylindrical battery cell 110 is widely known to those skilled in the art at the time of filing the patent application, and its detailed description is omitted herein.

Further, the plurality of cylindrical battery cells 110 may be arranged in the up-down direction (Z axis direction) and the front-rear direction (Y axis direction). The plurality of cylindrical battery cells 110 may be spaced a predetermined distance apart from each other. For example, as shown in FIG. 2, the plurality of cylindrical battery cells 110 may be arranged in the front-rear direction (Y axis direction) and the left-right direction (X axis direction). The positive electrode terminal 111 and the negative electrode terminal 112 may be provided on the right side (the positive X axis direction) of the plurality of cylindrical battery cells 110.

Additionally, the busbar 120 may include an electrically conductive material. For example, the busbar 120 may include at least one of a copper alloy, an aluminum alloy or a nickel alloy. The busbar 120 may have a plate shape. A part of the busbar 120 may be bent at least once.

Figure 4:
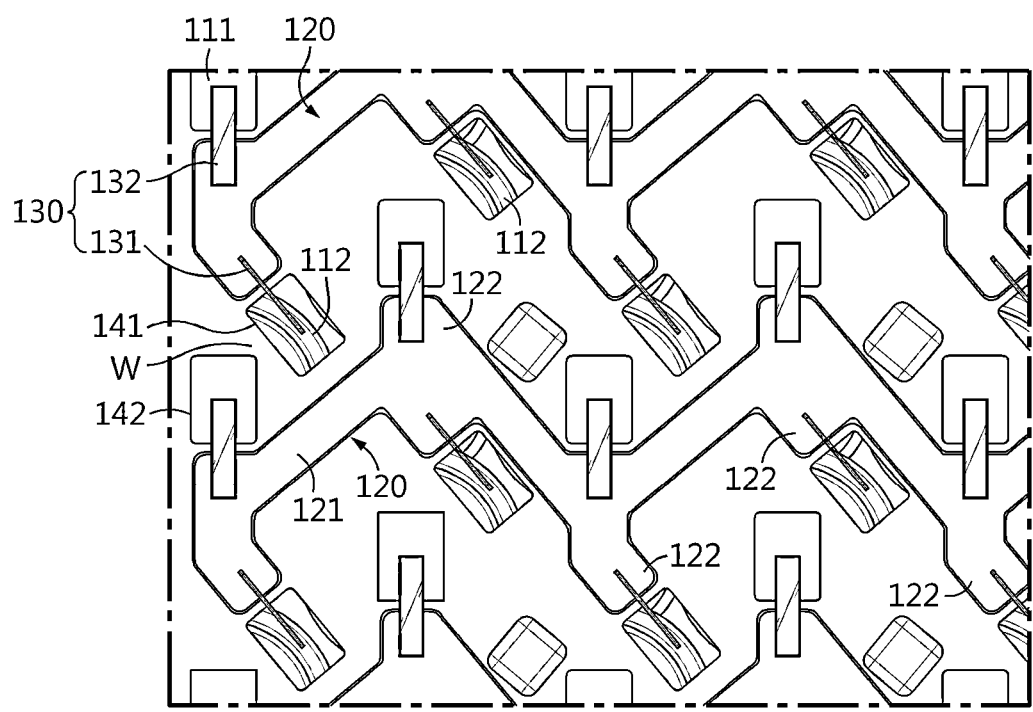
FIG. 4 is a schematic cross-sectional view of section A of FIG. 3.

FIG. 4 is a schematic cross-sectional view of section A of FIG. 3.

Referring to FIG. 4 together with FIGS. 2 and 3, each of the at least two types of connecting members 130 may include an electrically conductive material. For example, the connecting member 130 may include at least one of a copper alloy, an aluminum alloy or a nickel alloy. The connecting member 130 may have an elongated body. In other words, the body of the connecting member 130 may extend in the shape of a strap or a wire. One end of the connecting member 130 in the direction in which the body extends may be joined with the busbar 120. Additionally, one end of the connecting member 130 may be welded to the outer surface of the busbar 120. For example, the welding method may be ultrasonic welding.

Additionally, the other end of the connecting member 130 may be joined to any one of the positive electrode terminal 111 and the negative electrode terminal 112. In this instance, the other end of the connecting member 130 may be welded to the outer surface of the positive electrode terminal 111 or the negative electrode terminal 112. For example, the welding method may be ultrasonic welding.

Further, the at least two types of connecting members 130 may have different joined areas depending on the joined terminal among the positive electrode terminal 111 and the negative electrode terminal 112. For example, the at least two types of connecting members 130 may have different joined areas depending on the size of the exposed outer surface of the positive electrode terminal 111 and the negative electrode terminal 112. For example, when the positive electrode terminal 111 has a larger exposed outer surface than the negative electrode terminal 112, the joined area between the connecting member 130 and the positive electrode terminal 111 may be larger than the joined area between another connecting member 130 and the negative electrode terminal 112.

According to this configuration of the present disclosure, the present disclosure includes the busbar 120 and the at least two types of connecting members 130 having different joined areas depending on the joined terminal among the positive electrode terminal 111 and the negative electrode terminal 112, thereby optimizing the joined area between the connecting member 130 and the positive electrode terminal 111 or the negative electrode terminal 112.

That is, as opposed to connecting the busbar 120 to the positive electrode terminal 111 or the negative electrode terminal 112 using the existing single connecting member 130, the present disclosure may differently set the joined area depending on the type of the terminal to which the at least two types of connecting members 130 are joined. Accordingly, the present disclosure can effectively reduce the separation of the joined part between the connecting member 130 and the positive electrode terminal 111 or the negative electrode terminal 112 even in case that the battery module 100 is mounted in a vehicle that is exposed to an environment in which frequent vibrations and impacts occur. Ultimately, it is possible to effectively improve the durability of the battery module 100.

Additionally, the at least two types of connecting members 130 may include a first connecting member 131 connected to the negative electrode terminal 112 and a second connecting member 132 connected to the positive electrode terminal 111. For example, as shown in FIG. 4, one end of the first connecting member 131 may be joined to the busbar 120, and the other end may be joined to the negative electrode terminal 112 of the cylindrical battery cell 110. One end of the second connecting member 132 may be joined to the busbar 120, and the other end may be joined to the positive electrode terminal 111 of the cylindrical battery cell 110.

Moreover, the joined area between the second connecting member 132 and the positive electrode terminal 111 may be larger than the joined area between the first connecting member 131 and the negative electrode terminal 112.

According to this configuration of the present disclosure, the present disclosure is configured such that the joined area between the second connecting member 132 and the positive electrode terminal 111 is larger than the joined area between the first connecting member 131 and the negative electrode terminal 112, so the second connecting member 132 is joined to the positive electrode terminal 111 having a wider outer area than the negative electrode terminal 112 with a larger joined area, thereby effectively increasing the joining strength between the second connecting member 132 and the positive electrode terminal 111. Accordingly, it is possible to effectively reduce the separation of the joined part between the second connecting member 132 and the positive electrode terminal 111 or the negative electrode terminal 112 even in case that the battery module 100 of the present disclosure is mounted in a vehicle that is exposed to an environment in which frequent vibrations and impacts occur. Ultimately, it is possible to effectively improve the durability of the battery module 100.

Figure 5:
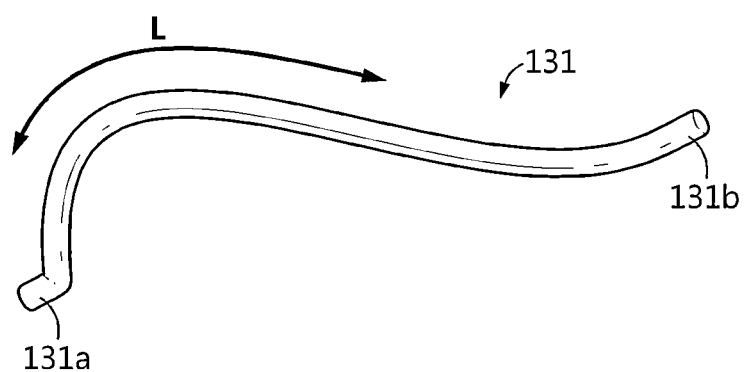
FIG. 5 is a schematic perspective view of a first connecting member of a battery module according to an embodiment of the present disclosure.

FIG. 5 is a schematic perspective view of the first connecting member of the battery module according to an embodiment of the present disclosure.

Referring to FIG. 5 together with FIG. 4, the first connecting member 131 may have a wire shape extending in the lengthwise direction L. For example, as shown in FIG. 4, one end 131a of the wire shape of the first connecting member 131 may be joined to the busbar 120. The other end 131b of the wire shape of the first connecting member 131 may be joined to the negative electrode terminal 112. Since the wire shape has a small diameter and extends in the lengthwise direction L, when compared with the positive electrode terminal 111, the first connecting member 131 has an optimum shape for being joined to the negative electrode terminal 112 having a narrow exposed outer surface.

Figure 6:
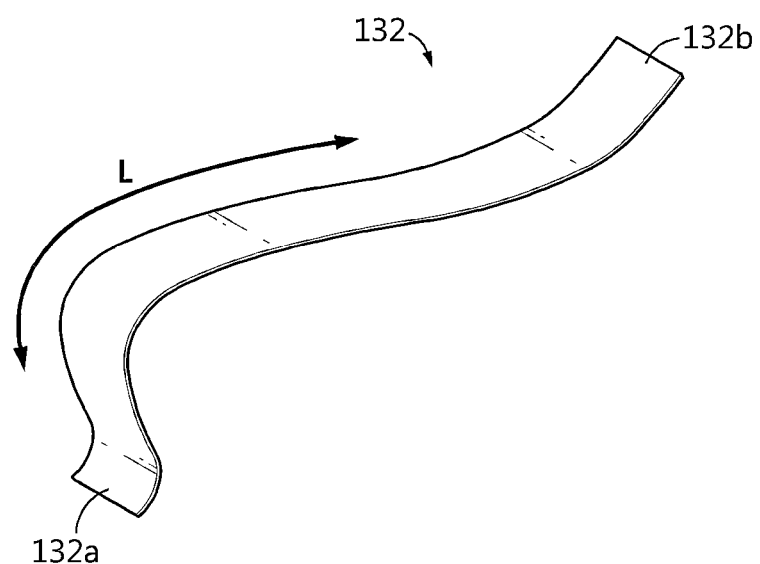
FIG. 6 is a schematic perspective view of a second connecting member of a battery module according to an embodiment of the present disclosure.

FIG. 6 is a schematic perspective view of the second connecting member of the battery module according to an embodiment of the present disclosure.

Referring to FIG. 6, the second connecting member 132 may have a strap shape extending in the lengthwise direction L. For example, as shown in FIG. 4, one end 132a of the strap shape of the second connecting member 132 may be joined to the busbar 120. The other end 132b of the strap shape of the second connecting member 132 may be joined to the positive electrode terminal 111. The second connecting member 132 may have a rectangular plate shape on the plane. One surface of the other end 132b of the second connecting member 132 in contact with the positive electrode terminal 111 may be joined to the outer surface of the positive electrode terminal 111. One surface of one end 132a of the second connecting member 132 in contact with the busbar 120 may be joined to the outer surface of the busbar 120.

That is, the second connecting member 132 having a strap shape has an optimum shape for being joined to the wide positive electrode terminal 111 having a wide exposed outer surface with a wider area than the negative electrode terminal 112.

Meanwhile, referring back to FIGS. 3 and 4, the battery module 100 of the present disclosure may further include a module case 140. The module case 140 may have an internal space in which the plurality of cylindrical battery cells 110 is received. The module case 140 may be a box-shaped case as a whole. The module case 140 may include a first case 145 and a second case 146. The first case 145 and the second case 146 may be configured to be connected to each other. In this instance, the first case 145 and the second case 146 may be connected by a hook coupling method. The module case 140 may include an electrically insulating material. For example, the electrically insulating material may be polyvinyl chloride or polyethylene terephthalate.

Additionally, the busbar 120 may be mounted on the outer side of the module case 140. For example, as shown in FIG. 1, eight busbars 120 may be mounted on the right side of the module case 140. In this instance, among the eight busbars 120, the top and bottom busbars 120a, 120b may have different shapes from the remaining six busbars 120. Additionally, each of the top and bottom busbars 120 may be configured to electrically connect only the positive electrode terminal 111 or the negative electrode terminal 112 of the plurality of cylindrical battery cells 110. The remaining six busbars 120 will be described in more detail below.

Moreover, the module case 140 may include a first exposure hole 141 and a second exposure hole 142. Specifically, the first exposure hole 141 may be configured to expose at least part of the negative electrode terminal 112. That is, the first exposure hole 141 may be configured to allow the first connecting member 131 connected to the negative electrode terminal 112 of the cylindrical battery cell 110 received in the module case 140 to pass therethrough.

Additionally, the second exposure hole 142 may be configured to expose at least part of the positive electrode terminal 111. That is, the second exposure hole 142 may be configured to allow the second connecting member 132 connected to the positive electrode terminal 111 of the cylindrical battery cell 110 received in the module case 140 to pass therethrough.

Further, the first exposure hole 141 and the second exposure hole 142 may be spaced a predetermined distance apart from each other. An outer wall W of the module case 140 may be disposed between the first exposure hole 141 and the second exposure hole 142.

According to this configuration of the present disclosure, the battery module 100 of the present disclosure includes the module case 140 having the first exposure hole 141 and the second exposure hole 142, thereby easily connecting the connecting members 131, 132 to the negative electrode terminal 112 and the positive electrode terminal 111 of the cylindrical battery cell 110 through the first exposure hole 141 and the second exposure hole 142 respectively.

Moreover, the outer wall W of the module case 140 between the first exposure hole 141 and the second exposure hole 142 may prevent the connecting member 130 from moving to the adjacent terminal of the opposite polarity when a short circuit occurs between the connecting member 130 and the positive electrode terminal 111 or the negative electrode terminal 112.

Additionally, when compared with the conventional module case 140 having the open side of the cylindrical battery cell 110, the first exposure hole 141 and the second exposure hole 142 of the present disclosure exposes only at least part of the positive electrode terminal 111 and the negative electrode terminal 112, which makes it possible to minimize the exposed area and minimize the likelihood of contact with an external conductive material, thereby effectively improving the safety of the battery module 100.

Figure 7:
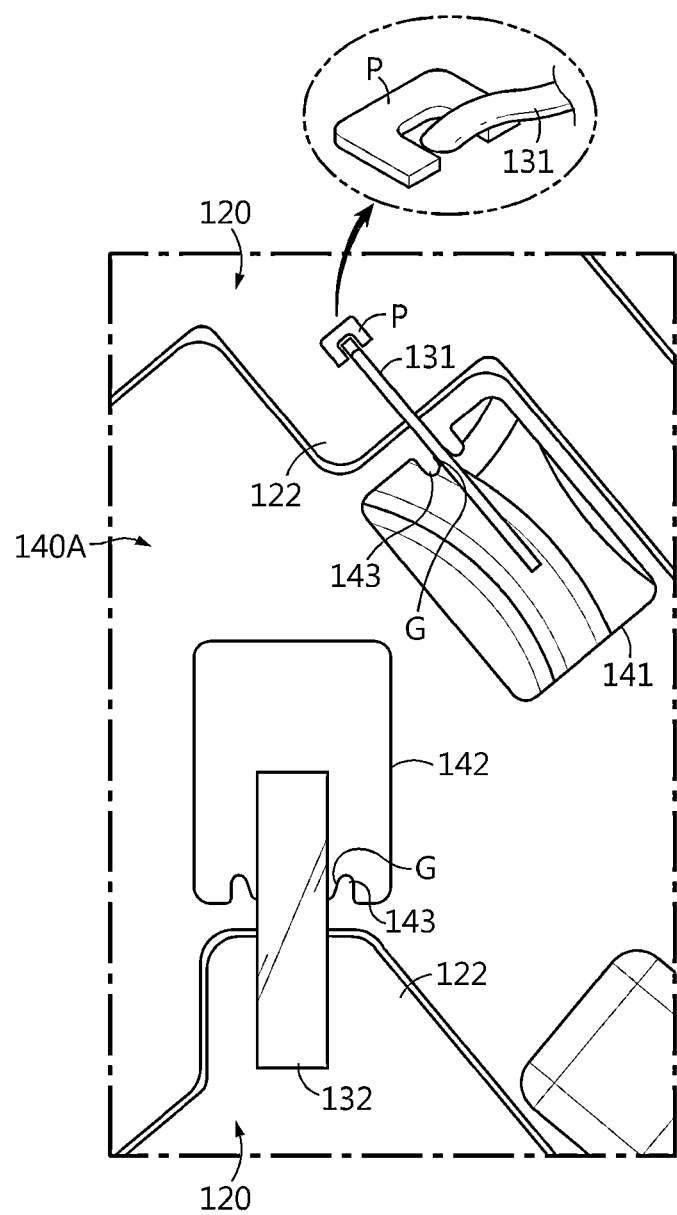
FIG. 7 is a schematic partial right side view of a battery module according to another embodiment of the present disclosure.

FIG. 7 is a schematic partial right side view of a battery module according to another embodiment of the present disclosure.

Referring to FIG. 7, when compared with the module case 140 of FIG. 3, the module case 140A of the battery module 100 according to another embodiment of the present disclosure may further include a protrusion 143 and an insertion groove G. The components other than the module case 140A of the battery module 100 of FIG. 7 has the same components as the battery module 100 of FIG. 3, and description of such components is omitted herein.

Additionally, the protrusion 143 may extend from the edge of the first exposure hole 141 or the second exposure hole 142 to the connecting member 130. The protrusions 143 may have different shapes depending on the first connecting member 131 or the second connecting member 132 that is inserted into the insertion groove G. For example, as shown in FIG. 7, the first exposure hole 141 may have the first protrusion 143 that protrudes toward the first connecting member 131 of a wire shape. The second exposure hole 142 may have two second protrusions 143 that protrude from two sides of the edge toward the second connecting member 132 of a strap shape.

Specifically, the insertion groove G may be provided at a part of the protrusion 143, into which a part of the connecting member 130 is inserted. For example, as shown in FIG. 7, one protrusion 143 may have the insertion groove G into which a part of the first connecting member 131 of a wire shape is inserted. The other protrusion 143 may have the insertion groove G into which a part of the second connecting member 132 of a strap shape is inserted.

Referring back to FIGS. 2 and 4, the busbar 120 of the battery module 100 according to an embodiment of the present disclosure may have an extended portion 121 and a connection portion 122. Specifically, the extended portion 121 may be a body portion of the busbar 120. The extended portion 121 may be disposed on one side where the positive electrode terminal 111 and the negative electrode terminal 112 of the plurality of cylindrical battery cells 110 are disposed. The extended portion 121 may be spaced a predetermined distance apart in a more outward direction than the plurality of cylindrical battery cells 110.

For example, as can be seen from FIGS. 1 and 2, the busbar 120 may be mounted on the right side of the module case 140. That is, the busbar 120 may be disposed opposite to the plurality of cylindrical battery cells 110 with the module case 140 interposed between.

Additionally, the extended portion 121 may extend along a direction in which the plurality of cylindrical battery cells 110 is arranged. That is, the extended portion 121 may be disposed on one side where the positive electrode terminal 111 and the negative electrode terminal 112 of the plurality of cylindrical battery cells 110 are disposed. This may be configured such that the extended portion 121 is disposed adjacent to the positive electrode terminal 111 and the negative electrode terminal 112 of the plurality of cylindrical battery cells 110.

Moreover, the connection portion 122 may protrude from the extended portion 121 toward the positive electrode terminal 111 or the negative electrode terminal 112. Additionally, the connection portion 122 may be configured to be joined to a part of the first connecting member 131 or the second connecting member 132. For example, referring to FIG. 4, the busbar 120 may have the extended portion 121 extending in zigzag in the vertical direction (in the Z axis direction in FIG. 1), and the connection portion 122 protruding from the extended portion 121 toward the positive electrode terminal 111 or the negative electrode terminal 112. The connection portion 122 may be joined to the end of the first connecting member 131 or the second connecting member 132.

According to this configuration of the present disclosure, the busbar 120 of the present disclosure has the extended portion 121 and the connection portion 122, thereby minimizing the extended length of the connecting member 130. That is, the extended portion 121 and the connection portion 122 are configured such that a part of the busbar 120 is as close to the positive electrode terminal 111 or the negative electrode terminal 112 as possible, thereby minimizing the extended length of the connecting member 130 configured to connect the connection portion 122 to the positive electrode terminal 111 or the negative electrode terminal 112. Accordingly, the present disclosure may effectively reduce the increased material cost and increased short circuit risk caused by collision with external materials with the increasing length of the connecting member 130.

Additionally, the plurality of cylindrical battery cells 110 may be arranged in a plurality of rows and a plurality of columns. For example, as shown in FIG. 2, the plurality of cylindrical battery cells 110 may be arranged in the row direction (Y axis direction) and column direction (Z axis direction).

Among the plurality of cylindrical battery cells 110, the plurality of cylindrical battery cells 110 arranged in each row may be spaced apart in the column direction. For example, the plurality of cylindrical battery cells 110 arranged in a row may be spaced apart in the upward or downward direction with respect to the center in the vertical direction.

In this instance, the extended portion 121 of the busbar 120 may extend in zigzag along the direction in which the plurality of cylindrical battery cells 110 is arranged. For example, as shown in FIG. 2, the extended portion 121 may extend in the row direction (Y axis direction), and may extend in the upward and downward direction in an alternating manner. That is, the extended portion 121 may extend in zigzag in the front-rear direction.

According to this configuration of the present disclosure, the busbar 120 of the present disclosure extends in zigzag in the direction in which the plurality of cylindrical battery cells 110 is arranged, thereby minimizing the extended length of the connecting member 130. That is, a part of the busbar 120 extends in zigzag adjacent to the positive electrode terminal 111 or the negative electrode terminal 112, thereby minimizing the extended length of the connecting member 130. Accordingly, the present disclosure may effectively reduce the increased material cost and increased short circuit risk caused by collision with external materials with the increasing length of the connecting member 130.

Referring back to FIG. 7, when compared with the busbar 120 shown in FIG. 4, the busbar 120 of the battery module 100 according to another embodiment of the present disclosure may further include a fixed protrusion P in the connection portion 122. The other components of the busbar 120 are the same as the busbar 120 shown in FIG. 4, and its description is omitted herein.

Specifically, the fixed protrusion P may be configured to be disposed around the end of the first connecting member 131. The fixed protrusion P may protrude out of a part of the connection portion 122. The fixed protrusion P may be configured to be disposed around at least one side of the end of the first connecting member 131. For example, as shown in FIG. 7, the busbar 120 may include the fixed protrusion P configured to be disposed around three sides of the end of the first connecting member 131. The fixed protrusion P may protrude toward the cylindrical battery cell 110 (outwards).

According to this configuration of the present disclosure, the present disclosure includes the fixed protrusion P protruding from a part of the connection portion 122 of the busbar 120, thereby preventing the end of the first connecting member 131 joined to the connection portion 122 from being separated by external impacts. That is, the fixed protrusion P may prevent the separation by collision with external materials at the joined part between the end of the first connecting member 131 and the connection portion 122. Accordingly, the present disclosure may minimize the poor connection between the busbar 120 and the connecting member 130, thereby effectively enhancing the durability.

Meanwhile, a battery pack (not shown) according to an embodiment of the present disclosure may include at least one battery module 100 and a BMS electrically connected to the busbar 120 of the battery module 100. The BMS may include various types of circuits or devices to control the charge/discharge of the plurality of battery cells.

Meanwhile, a vehicle (not shown) according to an embodiment of the present disclosure may include at least one battery module 100 and a receiving space in which the battery module 100 is received. For example, the vehicle may be an electric vehicle, an electric scooter, an electric wheelchair or an electric bike.

Meanwhile, the terms indicating directions as used herein such as upper, lower, left, right, front and rear are used for convenience of description only, and it is obvious to those skilled in the art that the term may change depending on the position of the stated element or an observer.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

What is claimed is:

1. A battery module, comprising:
   a plurality of cylindrical battery cells each having a positive electrode terminal and a negative electrode terminal on one side of each respective battery cell;
   a busbar including an electrically conductive material and having a plate shape;
   at least two types of connecting members each including an electrically conductive material, and having an elongated body, wherein one end in a direction in which the elongated body extends is joined to the busbar, and the other end is joined to one of the positive electrode terminal and the negative electrode terminal, the at least two types of connecting members having different joined areas depending on a joined terminal among the positive electrode terminal and the negative electrode terminal; and a module case having an internal space in which the plurality of cylindrical battery cells is received, wherein:

the plurality of cylindrical battery cells includes a particular cylindrical battery cell;

the module case has a first exposure hole and a second exposure hole;

at least part of the negative electrode terminal of the particular cylindrical battery cell is exposed to an outside of the battery module through the first exposure hole; and at least part of the positive electrode terminal of the particular cylindrical battery cell is exposed to the outside of the battery module through the second exposure hole different from the first exposure hole.

2. The battery module according to claim 1, wherein the positive electrode terminal has a larger exposed outer surface area than the negative electrode terminal, wherein the at least two types of connecting members include a first connecting member connected to the negative electrode terminal and a second connecting member connected to the positive electrode terminal, and wherein the joined area between the second connecting member and the positive electrode terminal is larger than the joined area between the first connecting member and the negative electrode terminal.

3. The battery module according to claim 1, wherein the connecting members include:

a first connecting member having a wire shape extending in a lengthwise direction; and a second connecting member having a strap shape extending in the lengthwise direction.

4. The battery module according to claim 1, wherein the busbar is mounted on an outer side of the module case.

5. The battery module according to claim 4, wherein the module case includes:

a protrusion that protrudes from an edge of the first exposure hole or the second exposure hole toward a connecting member; and an insertion groove at a part of the protrusion, into which a part of the connecting member is inserted, wherein the connecting member is one of the connecting members.

6. The battery module according to claim 1, wherein the busbar includes:

an extended portion disposed on one side of the plurality of cylindrical battery cells and extending along a direction in which the plurality of cylindrical battery cells is arranged; and a connection portion that protrudes from the extended portion toward the positive electrode terminal or the negative electrode terminal and is configured to be joined to a part of a connecting member, wherein the connecting member is one of the connecting members.

7. The battery module according to claim 6, wherein the plurality of cylindrical battery cells is arranged in a plurality of rows and a plurality of columns, and wherein the busbar extends in zigzag along the direction in which the plurality of cylindrical battery cells is arranged.

8. The battery module according to claim 6, wherein the busbar includes a fixed protrusion that protrudes from a part of the connection portion.

9. A battery pack comprising at least one battery module according to claim 1.

10. A vehicle comprising at least one battery module according to claim 1.

11. The battery module according to claim 1, wherein the first and second exposure holes corresponding to the negative and positive electrode terminals of the particular cylindrical battery cell are spaced apart from each other.

12. The battery module according to claim 1, wherein an outer wall of the module case is disposed between the first and second exposure holes corresponding to the negative and positive electrode terminals of the particular cylindrical battery cell.

* * * * *